United States Patent [19]

Piosenka et al.

[11] Patent Number: 4,944,008

[45] Date of Patent: Jul. 24, 1990

[54] ELECTRONIC KEYING SCHEME FOR LOCKING DATA

[75] Inventors: Gerald V. Piosenka, Scottsdale; William R. Worger, Mesa; Michael A. Savage, Chandler, all of Ariz.

[73] Assignee: Motorola, Inc., Schaumburg, Ill.

[21] Appl. No.: 157,002

[22] Filed: Feb. 18, 1988

[51] Int. Cl.⁵ .............................................. H03K 1/02
[52] U.S. Cl. ...................................... 380/46; 380/23; 380/25
[58] Field of Search ............................. 380/46, 23, 25

[56] References Cited

U.S. PATENT DOCUMENTS

| | | | |
|---|---|---|---|
| 4,193,131 | 3/1980 | Lennon et al. | 380/25 |
| 4,213,118 | 7/1980 | Genest et al. | 380/23 |
| 4,310,720 | 1/1982 | Check, Jr. | 380/49 |
| 4,369,332 | 1/1983 | Campbell, Jr. | 380/23 |
| 4,471,216 | 9/1984 | Herve | 380/25 |
| 4,691,355 | 9/1987 | Wirstrom et al. | 380/25 |
| 4,694,492 | 9/1987 | Wirstrom et al. | 380/25 |

Primary Examiner—Thomas H. Tarcza
Assistant Examiner—David Cain
Attorney, Agent, or Firm—Frank J. Bogacz

[57] ABSTRACT

A data locking system which modifies data in accordance with a renewable key variable derived from the exclusive ORing of a pseudorandom combination number from an external source means with an altered key variable.

15 Claims, 3 Drawing Sheets

ELECTRONIC KEYING SCHEME FOR LOCKING DATA

BACKGROUND OF THE INVENTION

This invention generally pertains to a data locking and unlocking method and device, and in particular to a changeable key scheme for securing data.

In the area of data locking systems, a high degree of security as well as limited access is desired. Some prior art data locking schemes are of a mechanical type, such as those used in the typical door lock, or of the type that use magnetic cards which contain the lock combination. The drawbacks of these types of locking systems are that it is possible for an adversary to steal the key or a lock combination. The key can be duplicated and then returned to the owner without the owner's knowledge. The key or combination has now been compromised and can be used until the lock is rekeyed. Thus, unauthorized access to a system or area can be obtained by unauthorized personnel and there would be no knowledge of, or limit to, this unauthorized access. When a mechanical lock is used, each person with access to the secured item has an identical key. This makes it difficult and costly to rekey the lock in case of compromise since many new keys would have to be issued. Further, the key or combination of mechanical systems are constant and cannot be easily changed.

A data encryption/decryption system encrypts and decrypts information under control of a variable called a key variable. Some encryption systems are currently in use which are well-known to those skilled in the art. Thus, when systems use schemes such as the data encryption standard (DES) security is heavily dependant on safe-guarding the key variable which controls the modification of data. If the key variable becomes known to unauthorized personnel, the encrypted data is no longer secure.

SUMMARY OF THE INVENTION

The present invention pertains to an electronic keying scheme for selectively locking and unlocking data and operates with a prior art data modification system in accordance with a key variable. One embodiment of the invention includes a random number generator having first and second ports. During the locking or encrypting phase, a key variable which is provided at one of the ports, is applied to the prior art data modification system for controlling the encryption of data and to one input of a logical combining means. The other output of the random number generator provides a different random number or psuedorandom combination number to another input of the logical combining means and to an external storage/source means. The logical combining means combines the key variable and the psuedorandom combination number to provide an altered key variable at an output terminal thereof. A memory connected to the output terminal of the logical combining means stores the altered form of the key variable while the data remains locked.

During the unlocking phase, the psuedorandom combination number is read out of the external storage/source means and applied to one of the inputs of the logical combining means. The modified key variable is applied to the other input of the logical combining means. The logical combining means responds to recombine these two signals to provide the key variable at its output terminal. The key variable is then applied to the data modification system to enable decryption or unlocking of the stored information.

The random number generator then generates a new key variable for controlling the reencryption of the sensitive and a new psuedorandom combination number. The new key variable and psuedorandom combination numbers are combined by the logical combining means to provide a new altered key variable. The new psuedorandom combination number is applied to the external storage/source means so that it will be available for unlocking the reencrypted data at a future time.

It is an object of the present invention to provide new and improved locking and unlocking systems for securing data.

It is a further object of the present invention to provide locking and unlocking systems supplying a high degree of security.

It is another object of the present invention to provide locking and unlocking systems which allow limited access to areas, equipment or information.

It is an object of the present invention to provide locking and unlocking systems with breach of security detection capabilities.

These and other objects of this invention will become apparent to those skilled in the art upon consideration of the accompanying specification, claims and drawings.

DESCRIPTION OF THE PREFERRED EMBODIMENTS

Figure 1:
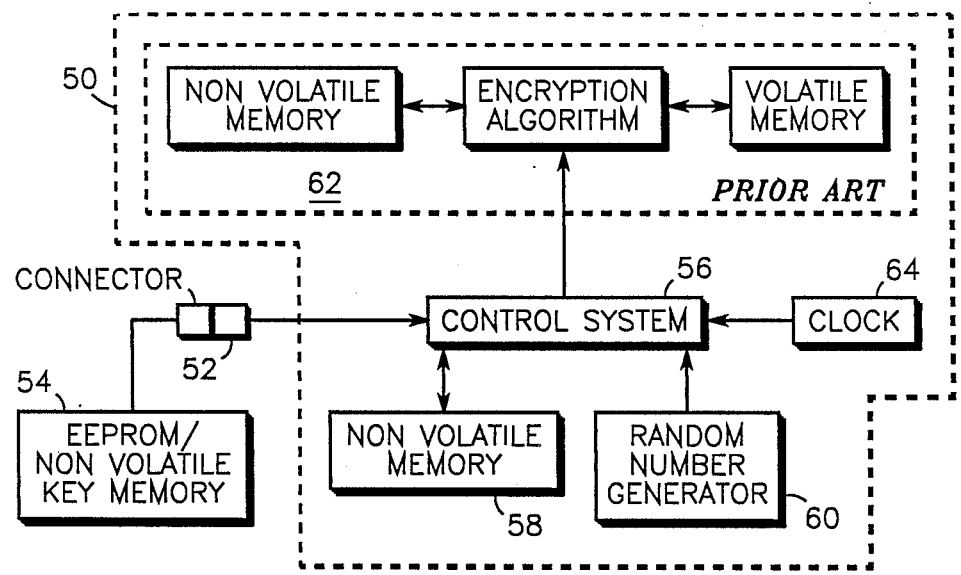
FIG. 1 is a simplified block diagram illustrating a data locking and unlocking system of an embodiment of the present invention.
Figure 3:
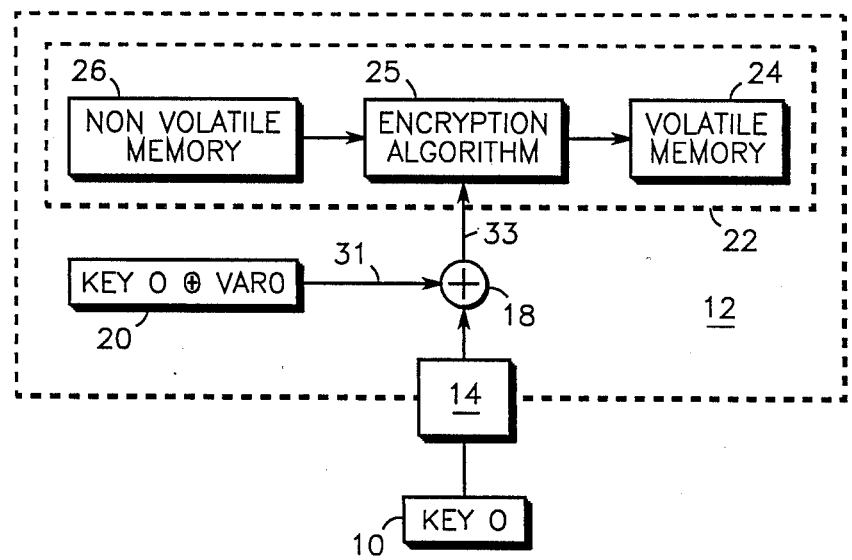
FIG. 3 is a block diagram illustrating the unlocking of information in an embodiment of the present invention.
Figure 2:
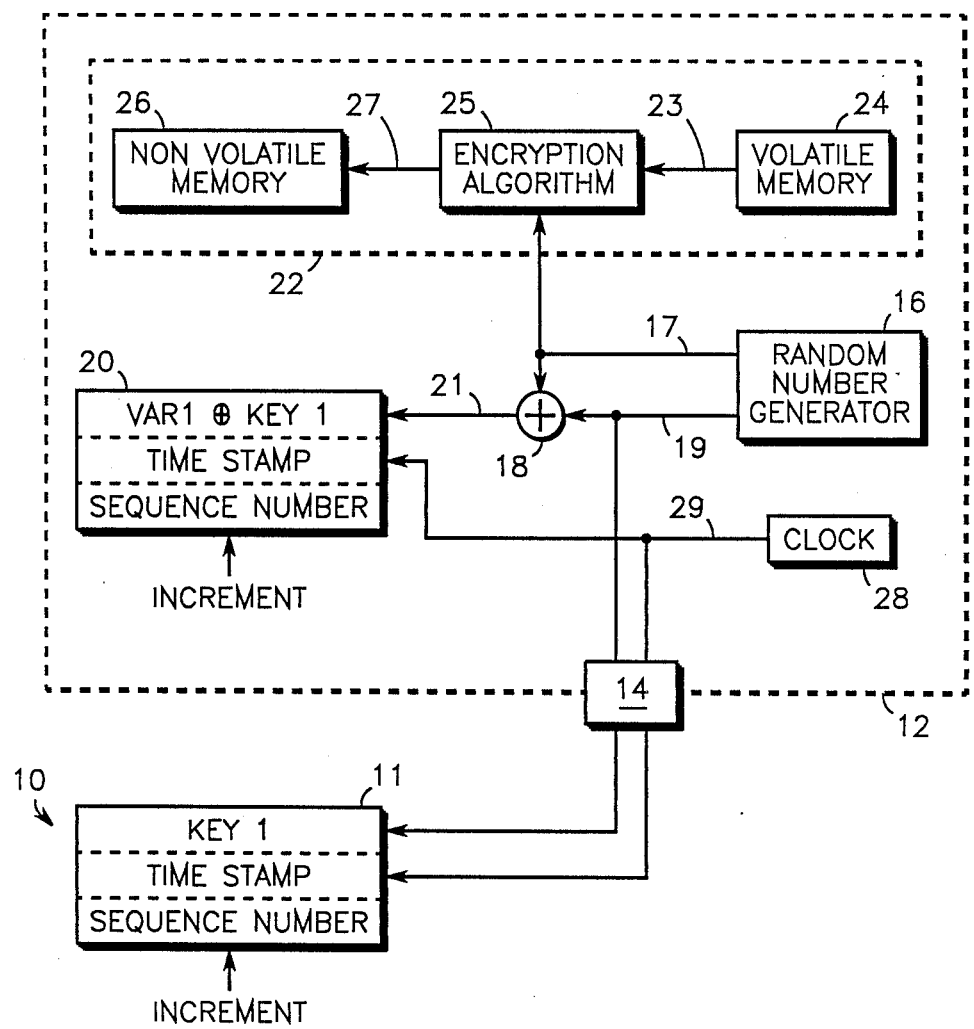
FIG. 2 is a block diagram illustrating the updating of the lock combination in an embodiment of the present invention.
Figure 4:
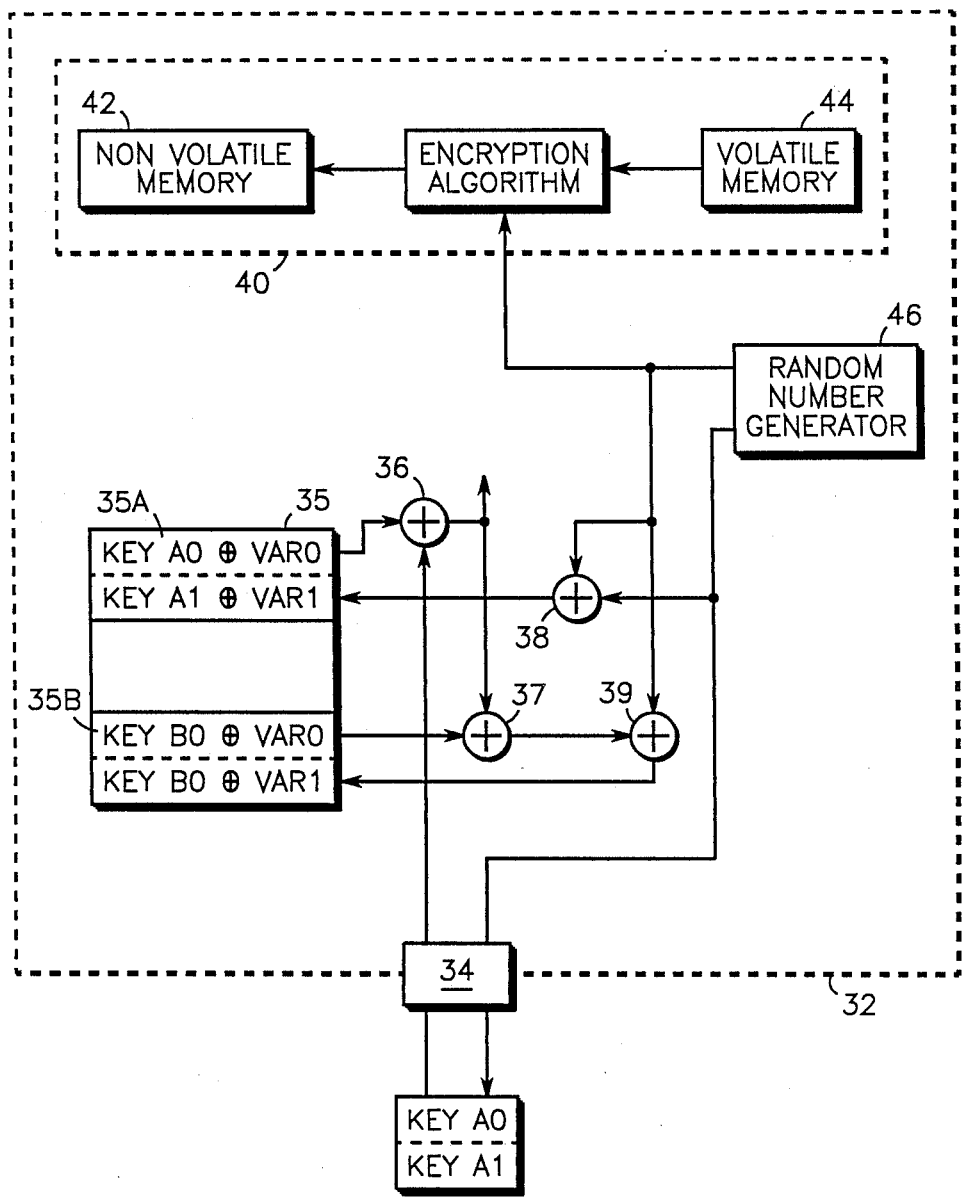
FIG. 4 is a block diagram illustrating the updating of a multiple key system lock combination in another embodiment of the present invention.

FIG. 1 is a simplified block diagram illustrating a lock 50 and a key 54 of an embodiment of the present invention. Lock 50 is equipped with a read/write connector 52 to which a key 54 can be removably connected. Key 54 includes a non-volatile memory or storage means such as an EEPROM. Read/write connector 52 couples key 54 and writes data from key 54 to a control system 56 located in lock 50. Control system 56 is coupled to an internal non-volatile memory 58, a random number generator 60, and data modification system 62. Data modification system 62 may be a data modification system known to those skilled in the art, such as the data encryption standard (DES) system. Control system 56 contains logic functions which logically combine data from non-volatile memory 58, key 54 and random number generator 60 to derive the key variable which is needed for the operation of data modification system 62. Control system 56 may be implemented in separate components or it may include a microprocessor. Control system 56 orders the steps and timing involved in the device of FIG. 1. The logic functions contained in control system 56 are described in greater detail below. In FIGS. 2, 3 and 4, the logic functions of control system 56 are shown. It will be understood by those skilled in the art that control system 56 controls the order of steps disclosed in a manner known to those skilled in the art.

FIG. 2 is a block diagram illustrating the encryption of data and updating of the lock combination or pseudorandom combination number in a first embodiment in accordance with the present invention. A key 10 which is a removable non-volatile external storage and source, includes an EEPROM and has an input/output port 11. The input/output port 11 of key 10 is removably connected to a lock 12 via an input/output port of a read/write connector 14.

A random number generator 16, contained in lock 12, generates two random numbers, a key variable and a pseudorandom combination number. Random number generator 16 has first and second output ports (17,19). The first output port 17 of random number generator 16 is coupled to a logic means 18 and to a data modification system 22. The second output 19 of random number generator 16 is coupled to logic means 18 and to read/write connector 14. A randomly generated key variable is input into logic means 18 and into data modification system 22 from the first output 17 of random number generator 16. A randomly generated pseudorandom combination number is input to logic means 18 and read/write means 14 through the second output port 19 of random number generator 16. In this embodiment, logic means 18 is an exclusive OR gate which has an output 21 coupled to a non-volatile storage means 20. Logic means 18, exclusively ORs, the key variable from port 17 and the pseudorandom combination number from port 19 to produce an altered key variable at port 21. The altered key variable is stored in non-volatile storage 20 which in this embodiment may be an EEPROM.

The data modification system 22 which also receives the key variable from the first output 17 of random number generator 16, may be any encryption/decryption system which modifies data. In this embodiment, data modification system 22 comprises a volatile data storage 24, having an output 23 coupled to a processor 25 which modifies data under control of the key variable from random number generator 16. A non-volatile data storage means 26 is coupled to an output 27 from processor 25. Data from volatile storage means 24 is directed to processor 25 where it is encrypted under the key variable from random number generator 16. This modified data is then stored in non-volatile storage means 26.

The pseudorandom combination number at port 19 randomly generated by random number generator 16 is also directed to read/write connector 14 which writes the pseudorandom combination number to key 10 where it is stored.

Further refinements of the present invention could include subdivision of non-volatile storage 20 for storing a time stamp and a sequence number which could be implemented in a known manner. A clock 28 has an output terminal 29, coupled to non-volatile storage 20 and to key 10, would input the time stamp in non-volatile storage 20 and key 10, each time key 10 is used. Also, the sequence number would be incremented each time a key was used, with the increment being added to the stored sequence number in both key 10 and non-volatile storage 20. The storing of the time stamp and the incrementing of the sequence number may be controlled by control system 56 of FIG. 1.

FIG. 3 is a block diagram illustrating the unlocking or decryption of data in the system shown in FIG. 1. Key 10 containing a pseudorandom combination number (KEY0) is connected to locking system 12 via read/write connector 14. Read/write connector 14 reads the pseudorandom combination number (KEY0) from key 10 and directs the pseudorandom combination number to exclusive OR gate 18. Non-volatile storage 20 containing the altered key variable has an output port 31 coupled to logic means 18 and applies the altered key variable to logic means 18. Logic means 18 which in this embodiment is an exclusive OR gate logically combines the pseudorandom combination number (KEY0) with the altered key variable resulting in the key variable (VAR0). Logic means 18 has an output port 33 coupled to data modification systems 22 which directs the key variable (VAR0) to data modification system 22. Encrypted data storage 26 containing encrypted data, directs the encrypted data to processor 25 where the data is decrypted using the key variable (VAR0) from exclusive OR gate 18. The decrypted data from encryption algorithm 25 is stored in volatile data storage 24. Volatile data storage 24 is coupled to a printer, monitor or like device in order to use the data. This data is then reencrypted as shown in FIG. 2. Random number generator 16 generates a new key variable and a new pseudorandom combination number. The new key variable and new pseudorandom combination number are again logically combined in exclusive OR gate 18 with the resulting new altered key variable stored in non-volatile storage 20. The new pseudorandom combination number is also directed to read/write connector 14 which writes the new pseudorandom combination number onto key 10. Data modification system 22 reecrypts the data using the new kay variable and stores the data in memory 26.

FIG. 4 illustrates a system for updating the lock combination in a two key system. It will be understood by those skilled in the art that this two key system could be further expanded into a multiple key system. Assume key A contains a pseudorandom combination number A0. Key A is coupled to lock 32 via read/write connector 34. Read/write connector 34 reads pseudorandom combination number A0 from Key A and directs it to an exclusive OR gate 36. A non-volatile storage 35 is subdivided into two sections corresponding to each key used. A subsection 35A used to store the key variable previously altered with the pseudorandom combination number from Key A directs the altered key variable to exclusive OR gate 36. The altered key variable and the pseudorandom combination number A0 are logically combined resulting in the derivation of key variable, VAR 0. Key variable, VAR 0, can then be inserted into a modification system 40 to unlock data stored in memory 42. This is not shown in FIG. 4 since the unlocking of data has been described and is illustrated in FIG. 3 and operates identically in the embodiment of FIG. 4.

Key variable VAR 0 is also directed to a further exclusive OR gate 37. A subsection 35B contains the altered key variable resulting from the previous exclusive ORing of pseudorandom combination number B0 from a Key B (not shown) and the key variable, VAR 0, directs the altered key variable to exclusive OR gate 37. The altered key variable and the key variable, VAR 0, are logically combined resulting in pseudorandom combination number B0 which is directed to exclusive OR gate 39. A random number generator 46 generates a new key variable, VAR 1, and directs this new key variable to data modification system 40 which then encrypts data from volatile data memory 44 under the new variable VAR 1. The encrypted data is then stored in non-volatile data memory 42. The new key variable VAR 1 from random number generator 46 is also directed to exclusive OR gate 38 and exclusive OR gate 39. Exclusive OR gate 39 logically combines pseudorandom combination number B0 from key B with the new key variable, VAR 1, resulting in a new altered key variable for key B which is stored in 35B.

Random number generator 46 also generates a new pseudorandom combination number, A1, for key A. New pseudorandom combination number, A1, is directed to exclusive OR gate 38 and read/write connector 34. Read/write connector 34 writes new pseudorandom combination number, A1, into key A. Exclusive OR gate 38 logically combines new pseudorandom combination number, A1, with new key variable, VAR 1, resulting in a new altered key variable. The new altered key variable is stored in non-volatile storage 35 A. Thus, the key being used (KEY A) is updated along with the key variable and the key not present (KEY B) has also been updated been updated without being present physically and has not been rendered invalid.

There is thus provided by the present invention a new and improved electronic keying scheme for securing information. One or more keys can be used in this system with updating of the keys pseudorandom combination number and the key variable after each use. This will not prevent adversaries from copying an original key. However, if the adversary uses the copied key, authorized personnel will be alerted to this fact when the correct owner tries to use his original key. In this case, the time frame or frames during which the copied key was used and the number of times information was accessed by the adversary can be determined. Further, the updating of the key variable does not render other keys invalid. Additional users can be added to the system by simply generating a new key.

Security breach detection has also been improved for when a key is copied and used by an adversary. An additional feature shown in FIG. 2 was incorporated into the system which allows the security monitor to determine the first time the system was breached and the last time. This is accomplished by placing a "time stamp" in both the key and the system memory each time a key is updated. This time stamp would then indicate the last time a key was used and the last time the system was opened by the key As part of this system, there can be a sequence count associated with the system and the key. This sequence number is incremented each time the key is used.

If a breach occurs where the original key is copied and then used, the copied key will be updated and the system storage will be updated. The system and false key time stamp will be updated and the system and false key sequence number will be updated. When the user of the original key attempts to use the key, it will not operate since the system's memory has been updated. The system security manager can determine the time of the last breach by examining the system time stamp. The manager can also determine the time before which the breach could not occur by examining the time stamp in the original key. The number of breaches can also be determined by subtracting the original key's sequence number from the system's sequence number.

This above-described lock and key system may be used in a variety of different ways. It can be used to securely store sensitive information which is encrypted for storage and decrypted when needed, or it can be used to allow access to various equipment such as a computer. To allow access to a computer locked using this device, the key is inserted into the lock and a key variable is produced. Data is decrypted using this key variable. The data may, for example, be a program that allows the computer to operate or the data may allow certain files in the computer to be accessed. There are many possible uses for data that can be securely encrypted and/or decrypted by authorized personnel.

The key variable, which is needed to decipher the encrypted information, does not appear explicitly in either the key or the system, so it cannot be duplicated. Further, even if the key variable is known, unauthorized access is limited because the key variable is changed after each use.

We claim:

1. In a digital processing system for providing security of data stored in the system, apparatus for protecting data in a memory of the system comprising:
   key means for storing a psuedorandom combination number, said key means corresponding to a key holder;
   first memory means for storing encrypted data;
   second memory means for storing decrypted data, corresponding to said encrypted data;
   decryption/encryption means connected between said first memory means and said second memory means, said decryption/encryption means operating to encrypt data for storage in said first memory means and further operating to decrypt data for storage in said second memory means;
   control means connected to said key means and to said decryption/encryption means, said control means operating in response to said pseudorandom combination number of said key means to produce a key variable to allow said decryption of data of said first memory means for access by said key holder to said second memory means; and
   said control means further operating to write a second psuedorandom combination number in said key means for subsequent accesses by said key holder.

2. Apparatus for protecting data in a memory as claimed in claim 1, wherein said control means includes third memory means for storing said psuedorandom combination number corresponding to said key holder, said psuedorandom combination number being stored in said third memory means in an encrypted manner.

3. Apparatus for protecting data in a memory as claimed in claim 1, wherein said control means further includes:
   psuedorandom number generation means for generating first and second psuedorandom numbers, said psuedorandom number generating means being connected to said decryption/encryption means; and
   combining means connected to said psuedorandom number generating means, to said third memory means and to said key means, said combining means operating in response to said first and second psuedorandom numbers to produce said key variable encrypted by said first psuedorandom number.

4. Apparatus for protecting data in a memory as claimed in claim 3, wherein there is further included means for connecting said psuedorandom number generation means to said key means, said means for connecting operating in response to said psuedorandom number generation means to write said second psuedorandom number, said key variable, to said key means.

5. Apparatus for protecting data in a memory as claimed in claim 4, wherein there is further included clock means connected to said third memory means and to said means for connecting, said clock means operating to store a time stamp and a sequence number in said third memory means corresponding to said encrypted key variable of said key holder and further operating to store said time stamp and said sequence number in said key means.

6. Apparatus for protecting data in a memory as claimed in claim 5, wherein said combining means includes exclusive-OR means.

7. Apparatus for protecting data in a memory as claimed in claim 6, wherein there is further included:
a second key holder including second key means, said second key holder requesting access to said decrypted data of said second memory means; and
means for updating connected to said psuedorandom number generation means, to said means for connecting and to said third memory means, said means for updating said key variable of said second key holder to encrypt said key variable with said first psuedorandom number generated for said first key holder.

8. Apparatus for protecting data in a memory as claimed in claim 7, wherein said means for updating includes exclusive-OR means.

9. A method for protecting data in a memory of a digital processing system, said method for protecting data in a memory comprising the steps of:
reading a first psuedorandom number from a key of a key holder;
combining said key with an encrypted key stored in a first memory to produce a key variable;
decrypting previously encrypted data stored in a second memory using said key variable;
storing said decrypted data in a third memory, said decrypted data for use and modification by said key holder;
generating first and second psuedorandom numbers;
encrypting said previously decrypted data of said third memory with said first psuedorandom number;
second storing said encrypted data in said second memory;
forming an encrypted key variable from said first and second psuedorandom numbers; and
third storing said second psuedorandom number in said key of said key holder.

10. A method for protecting data in a memory as claimed in claim 9, wherein there is further included the step of fourth storing said encrypted key variable in said first memory corresponding to said key holder.

11. A method for protecting data in a memory as claimed in claim 10, wherein there is further included the steps of:
second generating a time stamp and sequence number;
fifth storing said time stamp and sequence number in said first memory and in said key of said key holder.

12. A method for protecting data in a memory as claimed in claim 11, wherein said step of forming includes the step of exclusive-ORing said first and second psuedorandom numbers to produce said key variable, which corresponds to said first psuedorandom number encrypted by said second psuedorandom number.

13. A method for protecting data in a memory as claimed in claim 12, wherein there is further included the step of updating the key variable of a second key corresponding to a second key holder by encrypting said key variable of said second key with said first psuedorandom number, which corresponds to key variable of said first key.

14. A method for protecting data in a memory as claimed in claim 13, wherein said step of updating further includes the steps of:
reading said encrypted key variable of said first key from said first memory;
decrypting said key variable from said encrypted key variable of said first key;
second decrypting said second psuedorandom number of said second key;
encrypting said second psuedorandom number of said second key with variable of said first key to form a new encrypted key variable for said second key holder; and
storing said new encrypted key variable of said second key holder in said first memory corresponding to said second key; and
second storing said second psuedorandom number of said second key in said second key of said second key holder.

15. A method for protecting data in a memory as claimed in claim 14, wherein each of said steps of decrypting, second decrypting and encrypting include the step or exclusive-ORing.

* * * * *